US012643529B2

(12) United States Patent
Peranandam et al.

(10) Patent No.: US 12,643,529 B2
(45) Date of Patent: Jun. 2, 2026

(54) SITUATION AWARENESS GUIDED ENERGY HARVESTING SYSTEM

(71) Applicant: GM Global Technology Operations LLC, Detroit, MI (US)

(72) Inventors: Prakash M. Peranandam, Rochester Hills, MI (US); Shobhit Gupta, Royal Oak, MI (US); John C. Lyons, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 18/521,143

(22) Filed: Nov. 28, 2023

(65) Prior Publication Data

US 2025/0171008 A1     May 29, 2025

(51) Int. Cl.
    B60W 10/26        (2006.01)
    B60L 7/18         (2006.01)
            (Continued)

(52) U.S. Cl.
    CPC ............ B60W 10/26 (2013.01); B60W 10/06 (2013.01); B60W 10/18 (2013.01); B60W 30/18018 (2013.01); B60W 30/18127 (2013.01); B60W 30/18154 (2013.01); B60L 7/18 (2013.01); B60W 20/10 (2013.01); B60W 2420/403 (2013.01); B60W 2420/408 (2024.01); B60W 2420/54 (2013.01); B60W 2510/244 (2013.01); B60W 2520/10 (2013.01);
            (Continued)

(58) Field of Classification Search
    CPC ...... B60W 10/26; B60W 10/06; B60W 10/18; B60W 30/18018; B60W 2520/10; B60W 30/18154
    See application file for complete search history.

(56) References Cited

U.S. PATENT DOCUMENTS

2019/0071067 A1* 3/2019 Leone ..................... F02D 29/02
2021/0009128 A1* 1/2021 Jokela ................... B60W 20/12
            (Continued)

FOREIGN PATENT DOCUMENTS

DE     102014209851 A1   11/2015
DE     102016218070 B4    5/2018
            (Continued)

*Primary Examiner* — Toya Pettiegrew
(74) *Attorney, Agent, or Firm* — Vivacqua Crane, PLLC

(57)            ABSTRACT

A system for situation awareness guided energy harvesting (SAGEH) in vehicles includes a cloud computing server, and sensors capturing information about a host vehicle and remote vehicles, and their environments. The vehicles and server each have a controller that executes a SAGEH application including triggering collection of host and remote vehicle information and environmental information, continuously observing a traffic signal and traffic situation along a host vehicle path along a road segment, generating an estimate of a quantity of time for the traffic signal to change status and generating an estimated quantity of time for the host vehicle to stop at the traffic signal, in response to one or more of the estimated quantities of time, generating a control output command. The control output command causes the host vehicle to dynamically, automatically, and adaptively harvest energy by engaging one or more of a stop/start system, and a regenerative braking system.

18 Claims, 7 Drawing Sheets

(51) Int. Cl.
| | | |
|---|---|---|
| *B60W 10/06* | (2006.01) | |
| *B60W 10/18* | (2012.01) | |
| *B60W 20/10* | (2016.01) | |
| *B60W 30/18* | (2012.01) | |

(52) U.S. Cl.
CPC ..... *B60W 2552/05* (2020.02); *B60W 2552/10* (2020.02); *B60W 2552/30* (2020.02); *B60W 2552/53* (2020.02); *B60W 2555/60* (2020.02); *B60W 2556/10* (2020.02); *B60W 2556/45* (2020.02); *B60W 2710/0644* (2013.01)

(56)                    References Cited

U.S. PATENT DOCUMENTS

| 2021/0261152 A1* | 8/2021 | Meijburg | B60W 60/001 |
| 2024/0068830 A1* | 2/2024 | Fino | G08G 1/012 |

FOREIGN PATENT DOCUMENTS

| DE | 102019108607 B3 | 10/2020 |
| DE | 102020126684 A1 | 4/2022 |

* cited by examiner

SITUATION AWARENESS GUIDED ENERGY HARVESTING SYSTEM

INTRODUCTION

The present disclosure relates to energy saving systems in motor vehicles, and more specifically to energy harvesting in vehicles utilizing regenerative braking and/or internal combustion engine (ICE) automatic stop-start systems. Environmental and fuel or energy-efficiency are increasingly driving vehicle operation, including ICE automatic stop/start systems and energy harvesting, such as regenerative braking in electrified vehicle powertrains. In order to effectively manage energy usage and recuperation, static rule sets are often used to manage the performance of ICE automatic stop/start systems and regenerative braking systems. As a result, ICE automatic stop/start systems often cause the ICE to switch off in circumstances where immediate acceleration may be requested by vehicle operators. Likewise, regenerative braking systems may operate with limited adjustability. When ICE automatic stop/start and/or regenerative braking systems rely upon static rule sets, energy harvesting processes may transmit sudden acceleration and/or deceleration and thereby introducing unnecessary vehicle shuddering forces and discomfort to vehicle occupants, while reducing overall system efficiency.

Thus, while current systems and methods for energy saving systems in motor vehicles achieve their intended purpose, there is a need for a new and improved system and method for situationally aware energy harvesting in vehicles that utilize existing hardware, that maintain or decrease system component complexity and computational complexity, while improving vehicle operator comfort and satisfaction, and while reducing energy consumption in vehicles equipped with the system.

SUMMARY

According to several aspects of the present disclosure, a system for situation awareness guided energy harvesting in a vehicle includes a host vehicle, and one or more remote vehicles. The system further includes one or more sensors capturing host vehicle and remote vehicle information, and capturing environmental information about an environment of the host vehicle and the one or more remote vehicles. The system further includes a cloud computing server in communication with the host vehicle and the one or more remote vehicles. Each of the host vehicle, the one or more remote vehicles, and the cloud computing server has a controller. The controller has a processor, a memory, and one or more input/output (I/O) ports. The I/O ports are in communication with the one or more sensors. The memory stores programmatic control logic. The processor executes the programmatic control logic. The programmatic control logic includes an application for situation awareness guided energy harvesting (SAGEH). The SAGEH application includes at least first, second, third, fourth, and fifth control logics. The first control logic triggers collection of host vehicle information, remote vehicle information, and environmental information from the one or more sensors. The second control logic continuously observes a traffic signal and traffic situation along a host vehicle navigation path along a road segment. The third control logic generates a first estimated quantity of time for the traffic signal to change status and for generating a second estimated quantity of time for the host vehicle to stop at the traffic signal. The fourth control logic generates a control output command in response to one or more of the first and second estimated quantities of time. The fifth control logic causes a vehicle operator to generate feedback about the control output command. The control output command causes the vehicle to dynamically, automatically, and adaptively engage one or more of an internal combustion engine (ICE) stop/start system, and a regenerative braking system to dynamically, automatically, and adaptively harvest energy.

In another aspect of the present disclosure, the first control logic further includes detecting host and remote vehicle position information, host vehicle navigation information, and environmental information within data from the one or more sensors. The one or more sensors further include one or more of: cameras, Light Detection and Ranging (LIDAR) sensors, Radio Detection and Ranging (RADAR) sensors, Sound Navigation and Ranging (SONAR) sensors, ultrasonic sensors, motion sensors, inertial measurement units (IMUs), global positioning system (GPS) sensors, cellular tower sensors, and traffic signal sensors. The first control logic also determines from the host and remote vehicle position information, host vehicle navigation information, and environmental information that a situation of the host vehicle has changed. The first control logic further enables data collection specific to the road segment including, collecting from the one or more sensors: camera data, time of day (ToD) information, seasonal information, traffic information, and global position system (GPS) location and navigation information. The first control logic further includes control logic for deriving parametric information within the data specific to the road segment, and updating the data specific to the road segment with the parametric information and sending updated information about the road segment to the cloud computing server.

In yet another aspect of the present disclosure the first control logic further includes: control logic for accessing crowd sourced data stored in memory of the cloud computing server and obtained from sensors of the one or more remote vehicles, sensors disposed on infrastructure comprising: traffic signals, GPS satellites, and cellular towers. The first control logic further includes control logic for normalizing the data specific to the road segment to determine at least time-based traffic wait times and traffic signal duration information along the road segment.

In still another aspect of the present disclosure the second control logic further includes control logic for engaging an energy harvesting feature of the host vehicle; and executing a stop and go estimation control logic. The stop and go estimation control logic operates while the energy harvesting feature is engaged. The stop and go estimation control logic performs continuous situational information collection including: monitoring the navigation route of the host vehicle, monitoring GPS data, monitoring camera data, monitoring traffic information, and monitoring traffic signal periodicity.

In yet another aspect of the present disclosure the second control logic further includes control logic for processing data collected by the stop and go estimation control logic to calculate and derive parametric information about the road segment, the parametric information comprising: highway information, city road information, single or multiple lane information, straight road information, left turn information, right turn information, roundabout information, lane information, yield sign information, stop sign information, lane specific traffic signal and status information, other traffic signal and status information, pedestrian crossing information, and determining a quantity of pedestrians. The second control logic further includes control logic for performing focus area status quo analysis control logic to define a current situation of the host vehicle along the road segment.

In still another aspect of the present disclosure the third control logic further includes control logic for calculating the first and the second estimated quantities of time based on a current traffic signal status, a quantity of remote vehicles in front the host vehicle, a time of day, a static rule set, and crowd sourced data comprising: a GPS location of the host vehicle, a traffic signal identifier, current and historical time-based traffic wait times, and current and historical traffic signal durations.

In yet another aspect of the present disclosure the fourth control logic further includes control logic for utilizing a static rule set, vehicle parameters including current host vehicle speed and current host vehicle state of charge, and estimated traffic signal behavior to dynamically, automatically, and adaptively generate a control output command to one or more of a regenerative braking system and an automatic stop/start system of the host vehicle.

In still another aspect of the present disclosure, generating the control output command to the regenerative braking system of the host vehicle further includes dynamically, automatically, and adaptively adjusting a regenerative braking intensity based on: a speed of the host vehicle, a distance between the host vehicle and the traffic signal, a state of traffic on the road segment, and estimated traffic signal behavior.

In yet another aspect of the present disclosure generating the control output command to the automatic stop/start system of the host vehicle further includes: dynamically, automatically, and adaptively adjusting an ICE stop/start system to selectively stop an ICE of the host vehicle based on a speed of the host vehicle, a distance between the host vehicle and the traffic signal, a state of traffic on the road segment, and estimated traffic signal behavior.

In still another aspect of the present disclosure the fifth control logic further includes: control logic that collects time sequenced actions by a vehicle operator during a time window, and control logic that compares expected and actual behavior to a threshold value. Upon determining that the actual behavior is greater than the threshold value, the fifth control logic tags a current host vehicle location a difference between the actual and expected behaviors. The fifth control logic also triggers a change request in crowd-sourced data hosted in the memory of the cloud computing server. When a quantity of change requests meets or exceeds a change request threshold, the control logic triggers a change in expected behavior, and when a quantity of change requests is below the change request threshold, the control logic triggers additional data collection.

In several additional aspects of the present disclosure a method for situation awareness guided energy harvesting in a vehicle includes capturing, via one or more sensors, information about a host vehicle and one or more remote vehicles, and capturing environmental information about an environment of the host vehicle and the one or more remote vehicles. The method further includes utilizing a cloud computing server in communication with the host vehicle and the one or more remote vehicles, and utilizing one or more controllers disposed in each of the host vehicle, the one or more remote vehicles, and the cloud computing server. Each of the controllers includes a processor, a memory, and one or more input/output (I/O) ports. The I/O ports are in communication with the one or more sensors. The memory stores programmatic control logic. The processor executes the programmatic control logic. The programmatic control logic includes an application for situation awareness guided energy harvesting (SAGEH). The SAGEH application includes: triggering collection of host vehicle information, remote vehicle information, and environmental information from the one or more sensors; continuously observing a traffic signal and traffic situation along a host vehicle navigation path along a road segment; generating a first estimated quantity of time for the traffic signal to change status and for generating a second estimated quantity of time for the host vehicle to stop at the traffic signal; in response to one or more of the first and second estimated quantities of time, generating a control output command; and causing a vehicle operator to generate feedback about the control output command. The control output command causes the vehicle to dynamically, automatically, and adaptively engage one or more of an internal combustion engine (ICE) stop/start system, and a regenerative braking system to dynamically, automatically, and adaptively harvest energy.

In still another aspect of the present disclosure the method further includes detecting host and remote vehicle position information, host vehicle navigation information, and environmental information within data from the one or more sensors where the one or more sensors further include one or more of: cameras, Light Detection and Ranging (LIDAR) sensors, Radio Detection and Ranging (RADAR) sensors, Sound Navigation and Ranging (SONAR) sensors, ultrasonic sensors, motion sensors, inertial measurement units (IMUs), global positioning system (GPS) sensors, cellular tower sensors, and traffic signal sensors. The method further includes determining from the host and remote vehicle position information, host vehicle navigation information, and environmental information that a situation of the host vehicle has changed. The method further includes enabling data collection specific to the road segment including, collecting from the one or more sensors: camera data; time of day (ToD) information, seasonal information, traffic information, and global position system (GPS) location and navigation information. The method further includes deriving parametric information within the data specific to the road segment, and updating the data specific to the road segment with the parametric information and sending updated information about the road segment to the cloud computing server.

In yet another aspect of the present disclosure the method further includes accessing crowd sourced data stored in memory of the cloud computing server and obtained from sensors of the one or more remote vehicles, sensors disposed on infrastructure including: traffic signals, GPS satellites, and cellular towers, and normalizing the data specific to the road segment to determine at least time-based traffic wait times and traffic signal duration information along the road segment.

In still another aspect of the present disclosure the method further includes engaging an energy harvesting feature of the host vehicle, and executing a stop and go estimation control logic. The stop and go estimation control logic operates while the energy harvesting feature is engaged. The stop and go estimation control logic performs continuous situational information collection includes: monitoring the navigation route of the host vehicle, monitoring GPS data, monitoring camera data, monitoring traffic information, and monitoring traffic signal periodicity.

In yet another aspect of the present disclosure the method further includes processing data collected by the stop and go estimation control logic to calculate and derive parametric information about the road segment, the parametric information including: highway information, city road information, single or multiple lane information, straight road information, left turn information, right turn information, roundabout information, lane information, yield sign information, stop sign information, lane specific traffic signal and status information, other traffic signal and status information, pedestrian crossing information, and determining a quantity of pedestrians. The method further includes performing focus area status quo analysis control logic to define a current situation of the host vehicle along the road segment.

In still another aspect of the present disclosure the method further includes calculating the first and the second estimated quantities of time based on a current traffic signal status, a quantity of remote vehicles in front the host vehicle, a time of day, a static rule set, and crowd sourced data comprising: a GPS location of the host vehicle, a traffic signal identifier, current and historical time-based traffic wait times, and current and historical traffic signal durations.

In yet another aspect of the present disclosure the method further includes utilizing a static rule set, vehicle parameters including current host vehicle speed and current host vehicle state of charge, and estimated traffic signal behavior to dynamically, automatically, and adaptively generate a control output command to one or more of a regenerative braking system and an automatic stop/start system of the host vehicle.

In still another aspect of the present disclosure generating the control output command to the regenerative braking system of the host vehicle further includes: dynamically, automatically, and adaptively adjusting a regenerative braking intensity based on a speed of the host vehicle, a distance between the host vehicle and the traffic signal, a state of traffic on the road segment, and estimated traffic signal behavior, and dynamically, automatically, and adaptively adjusting an ICE stop/start system to selectively stop an ICE of the host vehicle based on a speed of the host vehicle, a distance between the host vehicle and the traffic signal, a state of traffic on the road segment, and estimated traffic signal behavior.

In yet another aspect of the present disclosure the method further includes collecting time sequenced actions by a vehicle operator during a time window, and comparing expected and actual behavior to a threshold value. Upon determining that the actual behavior is greater than the threshold value, tags a current host vehicle location a difference between the actual and expected behaviors; and triggering a change request in crowd-sourced data hosted in the memory of the cloud computing server. When a quantity of change requests meets or exceeds a change request threshold, the method triggers a change in expected behavior, and when a quantity of change requests is below the change request threshold, the method triggers additional data collection.

In several additional aspects of the present disclosure, a method for situation awareness guided energy harvesting in a vehicle includes: capturing, via one or more sensors, information about a host vehicle and one or more remote vehicles, and capturing environmental information about an environment of the host vehicle and the one or more remote vehicles; and utilizing a cloud computing server in communication with the host vehicle and the one or more remote vehicles. The method further includes utilizing one or more controllers disposed in each of the host vehicle, the one or more remote vehicles, and the cloud computing server. Each of the controllers includes a processor, a memory, and one or more input/output (I/O) ports. The I/O ports are in communication with the one or more sensors. The memory stores programmatic control logic. The processor executes the programmatic control logic. The programmatic control logic includes an application for situation awareness guided energy harvesting (SAGEH). The SAGEH application includes control logic for: triggering collection of host vehicle information, remote vehicle information, and environmental information from the one or more sensors, including: detecting host and remote vehicle position information, host vehicle navigation information, and environmental information within data from the one or more sensors. The SAGEH application further includes control logic for determining from the host and remote vehicle position information, host vehicle navigation information, and environmental information that a situation of the host vehicle has changed, enabling data collection specific to the road segment including, collecting from the one or more sensors: camera data; time of day (ToD) information, seasonal information, traffic information, and global position system (GPS) location and navigation information, and deriving parametric information within the data specific to the road segment. The SAGEH application further includes updating the data specific to the road segment with the parametric information and sending updated information about the road segment to the cloud computing server, and accessing crowd sourced data stored in memory of the cloud computing server and obtained from sensors of the one or more remote vehicles, sensors disposed on infrastructure comprising: traffic signals, GPS satellites, and cellular towers. The sensors further include one or more of: cameras, Light Detection and Ranging (LIDAR) sensors, Radio Detection and Ranging (RADAR) sensors, Sound Navigation and Ranging (SONAR) sensors, ultrasonic sensors, motion sensors, inertial measurement units (IMUs), global positioning system (GPS) sensors, cellular tower sensors, and traffic signal sensors. The SAGEH application further includes control logic for normalizing the data specific to the road segment to determine at least time-based traffic wait times and traffic signal duration information along the road segment. The SAGEH application further includes continuously observing a traffic signal and traffic situation along a host vehicle navigation path along a road segment, including: engaging an energy harvesting feature of the host vehicle, and executing a stop and go estimation control logic. The stop and go estimation control logic operates while the energy harvesting feature is engaged. The stop and go estimation control logic performs continuous situational information collection including: monitoring the navigation route of the host vehicle, monitoring GPS data, monitoring camera data, monitoring traffic information, and monitoring traffic signal periodicity. The SAGEH application further includes control logic for processing data collected by the stop and go estimation control logic to calculate and derive parametric information about the road segment. The parametric information includes: highway information, city road information, single or multiple lane information, straight road information, left turn information, right turn information, roundabout information, lane information, yield sign information, stop sign information, lane specific traffic signal and status information, other traffic signal and status information, pedestrian crossing information, and determining a quantity of pedestrians. The SAGEH application further includes control logic for performing focus area status quo analysis control logic to define a current situation of the host vehicle along the road segment, and for generating a first estimated quantity of time for the traffic signal to change status and for generating a second estimated quantity of time for the host vehicle to stop at the traffic signal, including: calculating the first and the second estimated quantities of time based on a current traffic signal status, a quantity of remote vehicles in front the host vehicle, a time of day, a static rule set, and crowd sourced data comprising: a GPS location of the host vehicle, a traffic signal identifier, current and historical time-based traffic wait times, and current and historical traffic signal durations. In response to one or more of the first and second estimated quantities of time, the SAGEH application generates a control output command, including: utilizing a static rule set, vehicle parameters including current host vehicle speed and current host vehicle state of charge, and estimated traffic signal behavior to dynamically, automatically, and adaptively generate a control output command to one or more of a regenerative braking system and an automatic stop/start system of the host vehicle. Generating the control output command to the regenerative braking system of the host vehicle further includes: dynamically, automatically, and adaptively adjusting a regenerative braking intensity based on a speed of the host vehicle, a distance between the host vehicle and the traffic signal, a state of traffic on the road segment, and estimated traffic signal behavior, and dynamically, automatically, and adaptively adjusting an ICE stop/start system to selectively stop an ICE of the host vehicle based on a speed of the host vehicle, a distance between the host vehicle and the traffic signal, a state of traffic on the road segment, and estimated traffic signal behavior. The method further includes causing a vehicle operator to generate feedback about the control output command, including: executing control logic of the SAGEH application that collects time sequenced actions by a vehicle operator during a time window; control logic that compares expected and actual behavior to a threshold value, wherein upon determining that the actual behavior is greater than the threshold value, tags a current host vehicle location a difference between the actual and expected behaviors; and control logic that triggers a change request in crowd-sourced data hosted in the memory of the cloud computing server. When a quantity of change requests meets or exceeds a change request threshold, the control logic triggers a change in expected behavior, and when a quantity of change requests is below the change request threshold, the control logic triggers additional data collection. The control output command causes the vehicle to dynamically, automatically, and adaptively engage one or more of an internal combustion engine (ICE) stop/start system, and a regenerative braking system to dynamically, automatically, and adaptively harvest energy.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
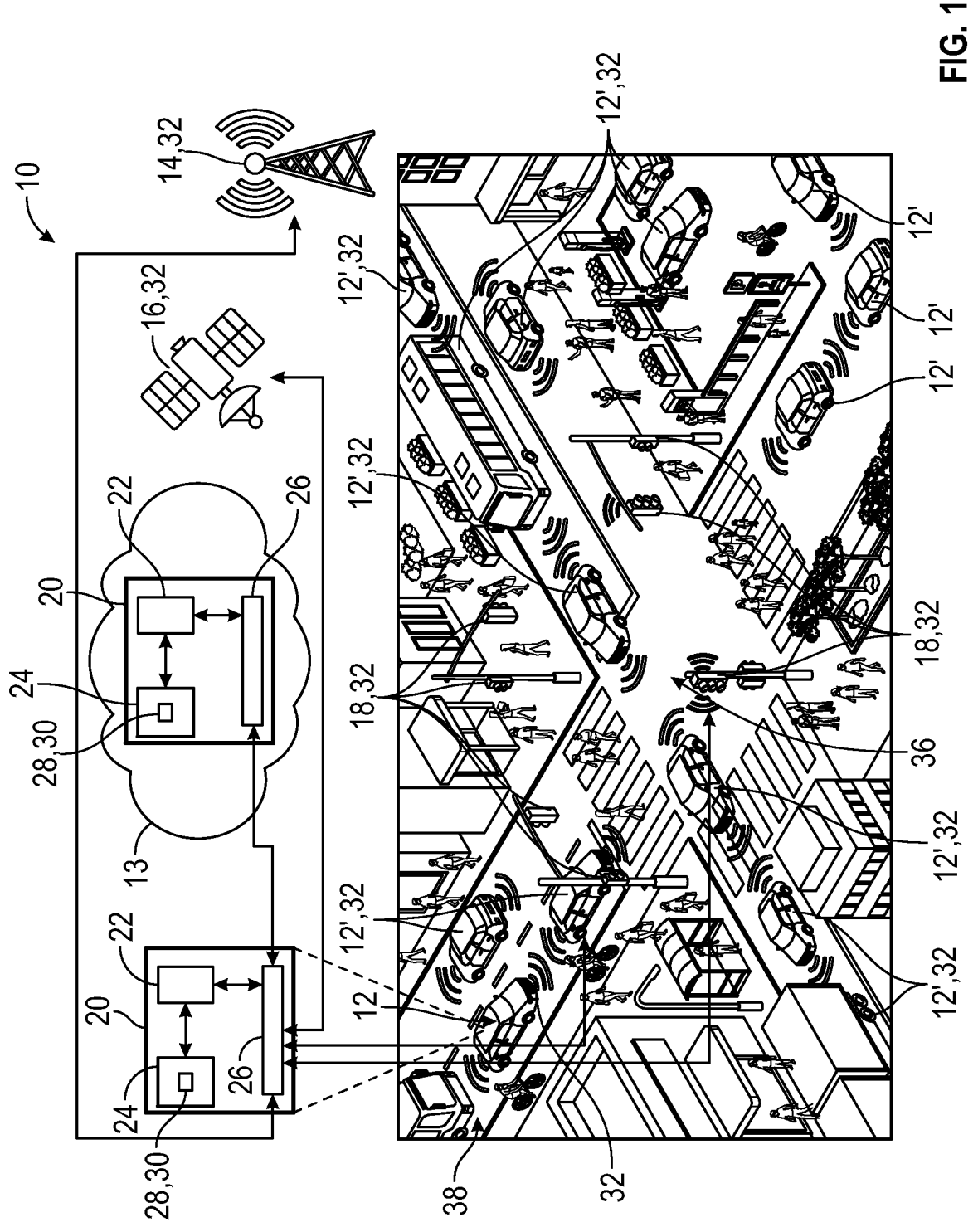
FIG. 1 is a schematic diagram depicting a situation awareness energy harvesting system according to an exemplary embodiment.
Figure 2:
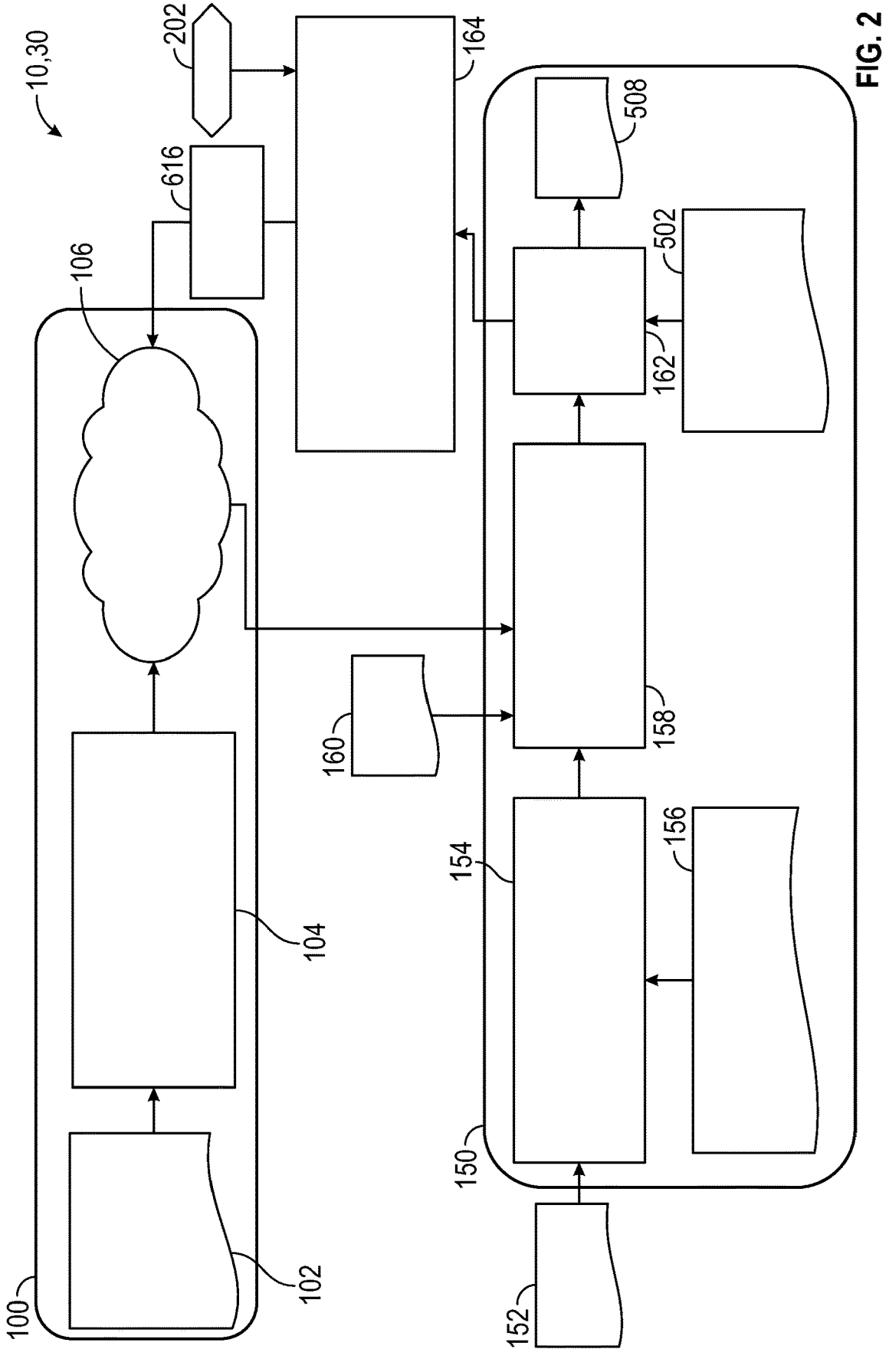
FIG. 2 is a flow diagram depicting logical flow of control logic of the situation awareness energy harvesting system of FIG. 1 according to an exemplary embodiment.

Referring to FIGS. 1 and 2, a system 10 for situation awareness guided energy harvesting is shown. The system 10 generally includes a host vehicle 12 and one or more remote vehicles 12', a remote cloud-computing server 13, and may further include infrastructure, such as one or more cellular towers 14, global positioning system (GPS) satellites 16, traffic signaling devices 18, or the like. While the vehicles 12' shown include passenger vehicles and busses, it should be appreciated that the vehicles 12' may be any of a wide variety of vehicles 12' including autonomous and manually driven vehicles, but not limited to: cars, trucks, sport-utility vehicles (SUVs), buses, semi-tractors, tractors used in farming or construction or the like, watercraft, aircraft such as planes or helicopters or the like without departing from the scope or intent of the present disclosure.

The vehicles 12' and the remote cloud-computing server 13 each include one or more controllers 20. The controllers 20 are non-generalized, electronic control devices having a preprogrammed digital computer or processor 22, non-transitory computer readable medium or memory 24 used to store data such as control logic, software applications, instructions, computer code, data, lookup tables, etc., and a transceiver or input/output (I/O) ports 26. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 24 excludes wired, wireless, optical, or other communication links that transport transitory electrical or other signals. A non-transitory computer readable memory 24 includes media where data can be permanently stored and media where data can be stored and later overwritten, such as a rewritable optical disc or an erasable memory device. Computer code includes any type of program code, including source code, object code, and executable code. The processor 22 is configured to execute the code or instructions. In vehicles 12', the controller 20 may be a dedicated Wi-Fi controller or an engine control module, a transmission control module, a body control module, an infotainment control module, etc. The I/O ports 26 are configured to wirelessly communicate using Wi-Fi protocols under IEEE 802.11x, cellular protocols such as global system for mobile communications (GSM), code division multiple access (CDMA), wireless in local loop (WLL), vehicle-to-vehicle (V2V) and vehicle-to-anything (V2X) systems, general packet radio services (GPRS), 1G, 2G, 3G, 4G long term evolution (LTE), 5G, or the like.

The memory 24 may store one or more applications 28. An application 28 is a software program configured to perform a specific function or set of functions. The application 28 may include one or more computer programs, software components, sets of instructions, procedures, functions, objects, classes, instances, related data, or a portion thereof adapted for implementation in a suitable computer readable program code. The applications 28 may be stored within the memory 24 of the on-board controllers 20 in the vehicles 12', or in additional or separate memory, such as within a memory 24 of a cloud computing device such as the cloud computing server 13. Examples of the applications 28 include audio or video streaming services, games, browsers, social media, and an application for situation-awareness guided energy harvesting (SAGEH) 30.

The system 10 utilizing the SAGEH 30 application acquires and or generates operational information from a variety of sources including, V2V and V2X, but not limited to: one or more sensors 32 disposed on the vehicles 12, 12' and capturing vehicle 12, 12' information including vehicle 12, 12' telematics and communications information such as vehicle 12, 12' speed, vehicle 12, 12' location information, vehicle 12, 12' altitude, and the like. In several aspects, the sensors 32 disposed on the host vehicle 12 may include any of a wide variety of sensor types, including but not limited to sensors 32 for detecting optical or electromagnetic information about the vehicles 12, 12', an environment surrounding the vehicles 12, 12', and the like. The sensors 32 may include, but are not limited to: cameras 34, Light Detection and Ranging (LIDAR) sensors, Radio Detection and Ranging (RADAR) sensors, Sound Navigation and Ranging (SONAR) sensors, ultrasonic sensors, or combinations thereof. The sensors 32 may further include motion sensors, such as inertial measurement units (IMUs). IMUs measure and report attitude or position, linear velocity, acceleration, and angular rates relative to a global reference frame using a combination of some or all of the following: accelerometers, gyroscopes, and magnetometers. In some examples, IMUs may also utilize global positioning system (GPS) data to indirectly measure attitude or position, velocity, acceleration, and angular rates of the one or more vehicles 12'.

In further examples, the host vehicle 12 the remote vehicles 12' and/or the infrastructure-based sensors 32 may acquire environmental data about the area surrounding the vehicles 12' such as traffic condition information, road condition and road surface information, weather information, and the like from remote sensor 32 sources such as sensors 32 of infrastructure including the GPS satellites 16, cellular towers 14, traffic signaling devices 18, or roadside sensing devices such as speed or traffic-sensing cameras, and the like.

In several aspects, the system 10 collects data from a variety of different sensor 32 sources including the cameras 34, traffic signaling devices 18, GPS satellites 16, and the like. The sensor 32 data obtained from the various sensors may include optical data, time of day (ToD) information, traffic density, traffic volume, traffic speed, traffic signal 18 periodicity, physical location information for vehicles 12, 12', one or more intersections 36 on a road segment 38, and the like. The sensor 32 data may be obtained by and continuously transmitted by the sensors 32, or may be periodically transmitted to the cloud-computing server 13 via the I/O ports of the various controllers 20, or collected and/or transmitted only upon the occurrence of a triggering event without departing from the scope or intent of the present disclosure. In the controller 20 of the cloud-computing server 13, data received from the various sensors 32 of vehicles, infrastructure, and the like is aggregated and analyzed to determine time-based traffic waiting times and traffic signal 18 duration information.

Turning now more specifically to FIG. 2 and with continuing reference to FIG. 1, the SAGEH 30 application is shown in schematic form as a series of control logic steps. The SAGEH 30 generally includes a data collection portion 100 and a feature flow portion 150 which communicate with one another via a series of control logic subroutines. The data collection portion 100 includes several subroutines of its own, specifically a first control logic 102 that acquires sensor 32 data, including camera 34 data, time-of-day information, traffic information, traffic signal 18 periodicity, GPS location information, lane information and the like. The data collection portion 100 then proceeds to block 104, where triggered data collection and templated data transmission from the vehicle(s) 12 to the cloud computing server 13 occurs. Camera 34 data, time of data, and other estimation parameters are included in the triggered and templated data transmission.

Figure 3:
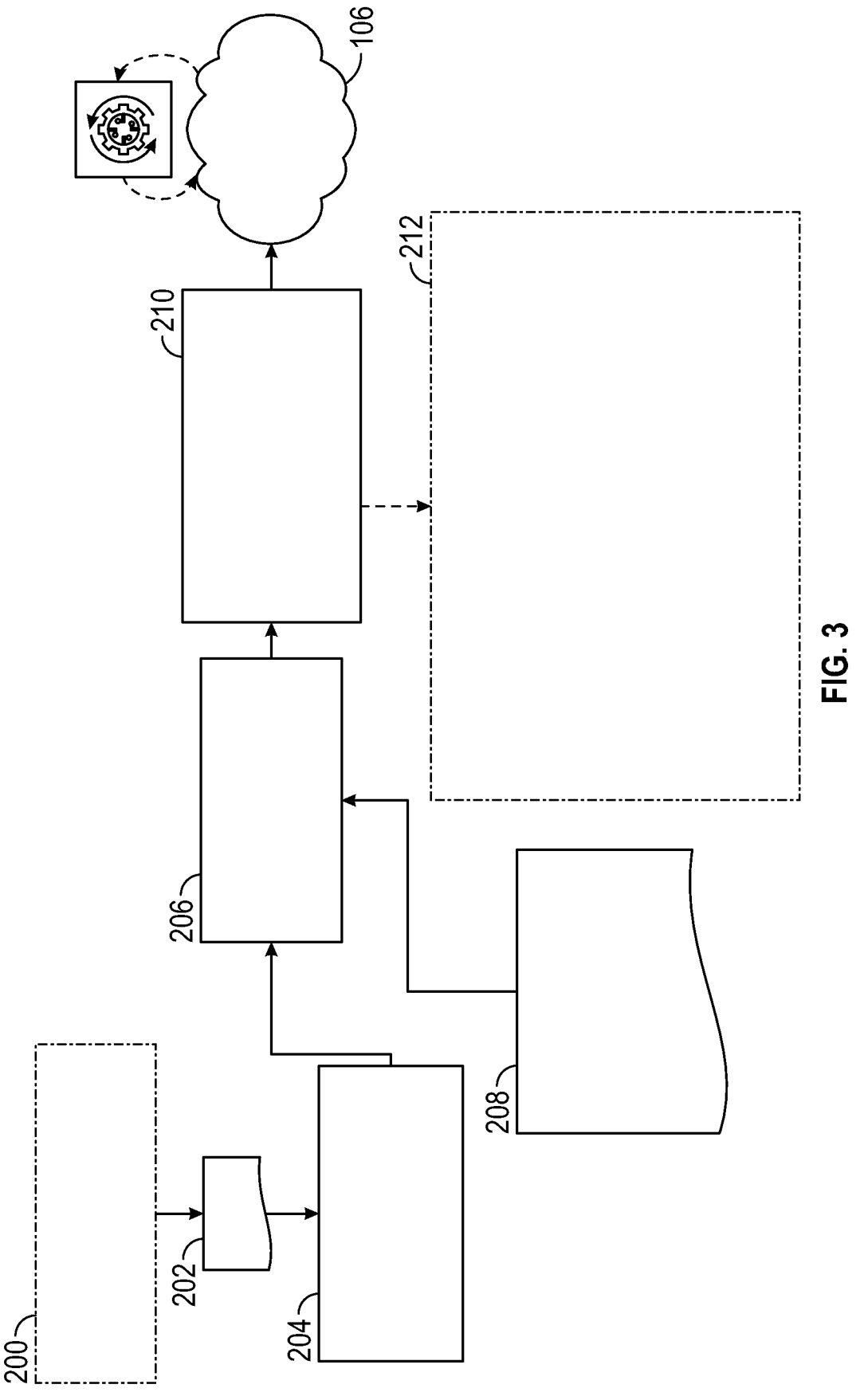
FIG. 3 is a flow diagram depicting logical flow of control logic for a triggered data collection and templated data transmission portion of the situation awareness energy harvesting system of FIG. 1 according to an exemplary embodiment.

Turning more specifically now to FIG. 3, and with continuing reference to FIGS. 1 and 2 the process of triggered and templated data transmission at block 104 of FIG. 2 is shown in additional detail. Beginning at block 200, one or more of the sensors 32 generates data about the host vehicle's 12 situation. The sensor 32 data may indicate that the host vehicle 12 is encountering a new traffic signal 18, a new situation on the road segment 38 or environmental change has occurred, or that data generated by the sensors 32 or received from the cloud-computing server 13 is out of synchronization. At block 202, the system 10 triggers a new inquiry. At block 204, the cloud-computing server 13 generates a navigation-based data request that causes the host vehicle 12 to utilize an onboard navigation system that may interface with one or more of the cellular towers 14 and GPS satellites 16 to determine a location of the host vehicle 12 and/or one or more remote vehicles 12'. At block 206, the SAGEH 30 application causes the system 10 to enable data collection from a specific location, or along a specific road segment 38. The data collected at block 206 is represented at block 208, and may include camera 34 data, time of day information, seasonal information, traffic information, GPS location and navigation information, and the like. From block 206, the SAGEH 30 application proceeds to block 210 where the sensor 32 data is processed to calculate and derive parametric information, and to time-synchronize data received. The processed sensor 32 data is then transmitted to the cloud-computing server 13. In several aspects, the data processing includes analyzing and extracting road segment 38 parametric data including the data represented at block 212. In several aspects, the data at block 212 includes, but is not limited to: a quantity of lanes on the road segment 38, a lane of current travel for the host vehicle 12 on the road segment 38, time-of-day, seasonal status, holiday status, whether the host vehicle 12 is a school bus or other such specialized vehicle 12, a duration of traffic signal 18 lights, traffic conditions (heavy to light), time and distance to reach a traffic signal 18 from a given location, average vehicle 12 speed, an estimated quantity of vehicles 12' in front of the host vehicle 12 based on: a distance from the traffic signal 18, or the like. From block 210, the SAGEH 30 application proceeds to block 106 where the templated sensor 32 data is compared to and/or added to crowd-sourced data hosted within the cloud computing server 13. In several aspects, the comparison at block 106 includes function approximation and normalization processes that allow for information extraction from the crowd-sourced data and from the templated sensor 32 data, including time-based traffic information, traffic wait time, and traffic signal 18 duration information. In an example, a regular peak traffic travel time from a current location to a traffic signal 18 may require approximately forty seconds to travel thirty-five (35) meters or less to the traffic signal 18. By contrast, traveling more than thirty-five meters to the traffic signal 18 at the same regular peak traffic travel time of day, it may take the same vehicle 12 ninety (90) seconds or more to travel to the traffic signal 18.

Referring once more to FIG. 2 and with continuing reference to FIGS. 1 and 3, once the function approximation and normalization processes for information extraction have occurred at block 106, the SAGEH 30 application proceeds to the feature flow portion 150. Specifically, the feature flow portion 150 begins at block 152 where an energy harvesting feature is engaged. The automatic energy harvesting features of each vehicle 12 may differ, however, it should be appreciated that energy harvesting features for vehicles 12' may include automated regenerative braking and/or internal combustion engine (ICE) automatic stop-start systems, combinations thereof, or similar such energy retaining or harvesting features for vehicles 12'. At block 154, the SAGEH 30 application utilizes the sensors 32, including cameras 34 to continuously or sectionally observe traffic signal 18 and situational status with respect to a host vehicle 12 navigation path. The sensor 32 data used is displayed schematically at block 156, and may include camera 34 data, LiDAR data, SONAR data, ultrasonic sensor 32 data, or the like, as well as ToD information, traffic information, traffic signal 18 periodicity, GPS location and navigational path information, and the like.

Figure 4:
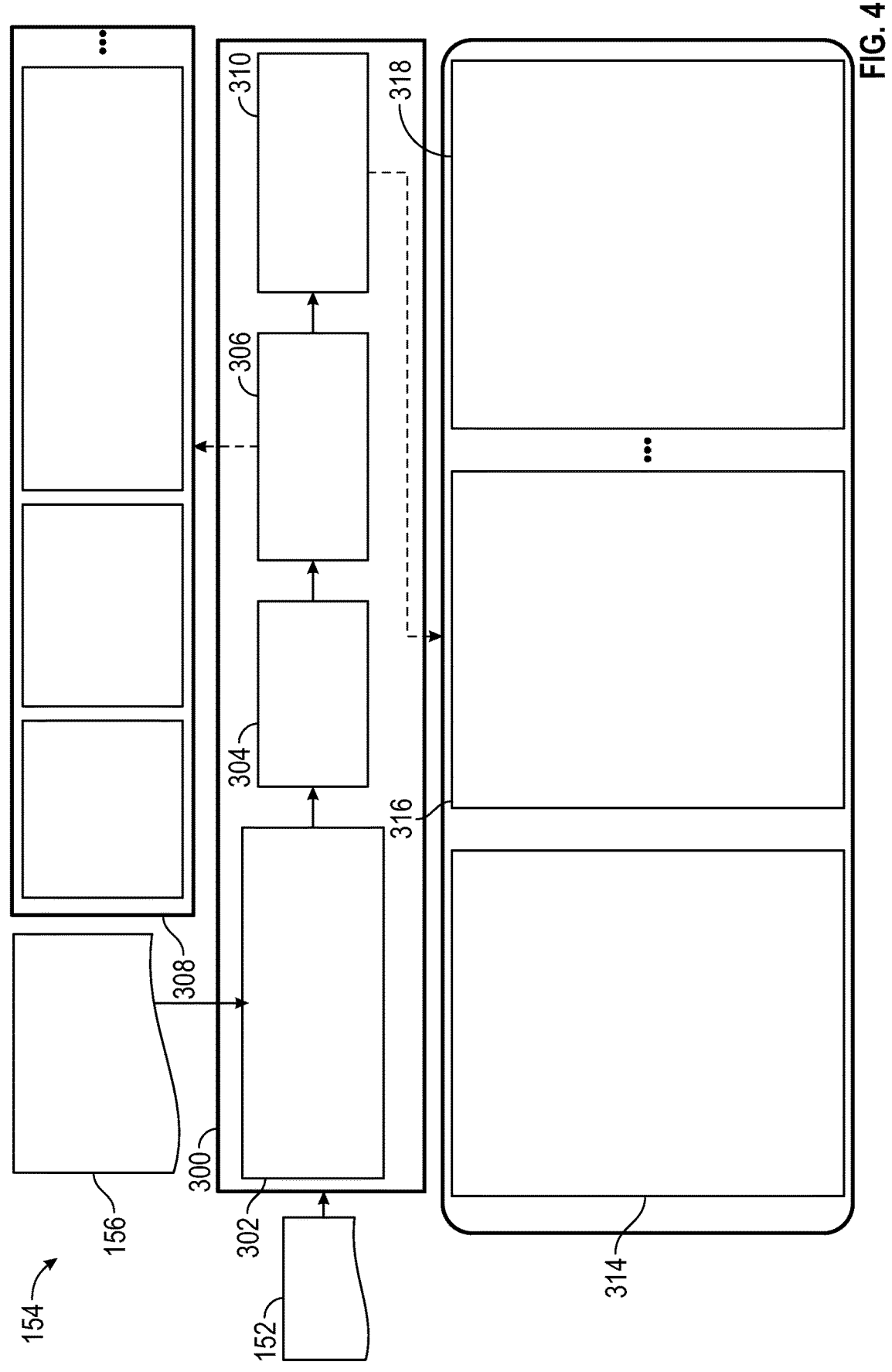
FIG. 4 is a flow diagram depicting logical flow of control logic for a continuous traffic observation portion of the situation awareness energy harvesting system of FIG. 1 according to an exemplary embodiment.

Turning now to FIG. 4 and with continuing reference to FIGS. 1-3, the continuous observation performed at block 154 is shown in additional detail. The continuous observation 154 generally includes a stop and go estimation subroutine 300 having several additional control logic subroutines. Specifically, when the energy harvesting feature 152 is engaged, the stop and go estimation subroutine 300 is also activated. The sensors 32, including cameras 34 acquire camera 34 data, traffic information, traffic signal 18 periodicity information, GPS information and navigational path information and at block 302, the stop and go estimation subroutine 300 continuously monitors the sensor 32 data and collects situational information about the host vehicle 12, the road segment 38, traffic signals 18, and the like. In several aspects, the information collected and stored in memory 24, may include navigational route selections, GPS data, camera 34 data, and the like. The stop and go estimation subroutine 300 then proceeds to block 304, where a route-based focus area determination is made. The route-based focus area may include a variety of different types of data, but should be understood to generally include map information based on: GPS information, current and/or historical navigation system route selections, and the like. From block 304, the stop and go estimation subroutine 300 proceeds to block 306 where the data from block 304 is processed to calculate and derive parametric information including but not limited to the content represented at block 308. Specifically, at block 308, the parametric information may include designations of different road segment 38 types, such as highway, city roads, two-way, single lane, multi-lane, or the like. Further parametric information may include road segment 38 characteristics, such as whether the road segment 38 is straight, has a left or right turn, a roundabout, and/or lane information. Likewise, traffic signal 18 and/or signage may be included in the parametric information. In some examples, traffic signal 18 and/or signage information may include yield signage, stop signage, lane-specific traffic signal 18 and status information, other traffic signal 18 status, the presence or absence of pedestrian crossings, as well as the presence and/or quantity of pedestrians, physical obstacles, curbs, traffic cones, and the like.

From block 306, the stop and go estimation subroutine 300 defines and analyses a focus area status quo at block 310. In several aspects, focus area status quo information is represented at block 312, and may include a series of different parameter sets that each define a distinct situation.

In a first example 314, a first status quo focus area may include defining that at the present moment a traffic signal 18 is red; that it will be approximately thirty seconds for the host vehicle 12 to reach the red traffic signal 18 in the manner that the host vehicle 12 is currently traveling; that there are approximately four other vehicles 12' in front of the host vehicle 12, accounting for approximately twenty meters between the host vehicle 12 and the red traffic signal 18; that there is at least one reference vehicle, such as a full-sized SUV in black color; that a color of the traffic signal 18 for traffic crossing the road segment 38 at an intersection 36 is yellow; that there is a pedestrian crossing at the intersection 36 or along the road segment 38; that there are three pedestrians on the host vehicle 12 path; and/or that there are six pedestrians on an opposite side of the host vehicle 12 path.

In a second example 316, a second status quo focus area may include defining that at the present moment a traffic signal 18 is red; that it will be approximately zero seconds for the host vehicle 12 to reach the red traffic signal 18 in the manner that the host vehicle 12 is currently traveling (i.e. that the host vehicle 12 has reached the traffic signal 18); that there are approximately four other vehicles 12' in front of the host vehicle 12, accounting for approximately twenty meters between the host vehicle 12 and the red traffic signal 18; that there is at least one reference vehicle, such as a full-sized SUV in black color; that a color of the traffic signal 18 for traffic crossing the road segment 38 at an intersection 36 is yellow; that there is a pedestrian crossing at the intersection 36 or along the road segment 38; that there are three pedestrians on the host vehicle 12 path; and/or that there are six pedestrians on an opposite side of the host vehicle 12 path.

In a third example 318, a third status quo focus area may include defining that at the present moment a traffic signal 18 is green; that it will be approximately sixty seconds for the host vehicle 12 to reach the green traffic signal 18 in the manner that the host vehicle 12 is currently traveling; that there are zero remote vehicles 12' in front of the host vehicle 12; that there is at least one reference vehicle, such as a white sedan of a particular color; that a color of the traffic signal 18 for traffic crossing the road segment 38 at an intersection 36 is red; that there is a pedestrian crossing at the intersection 36 or along the road segment 38; that there are zero pedestrians on the host vehicle 12 path; and/or that there are two pedestrians on an opposite side of the host vehicle 12 path. It should be appreciated, however, that while in the foregoing, the first, second, and third examples of status quo focus areas are intended as non-limiting examples of the types of data which may be found or determined by the focus area status quo analysis at block 310 without departing from the scope or intent of the present disclosure.

Figure 5:
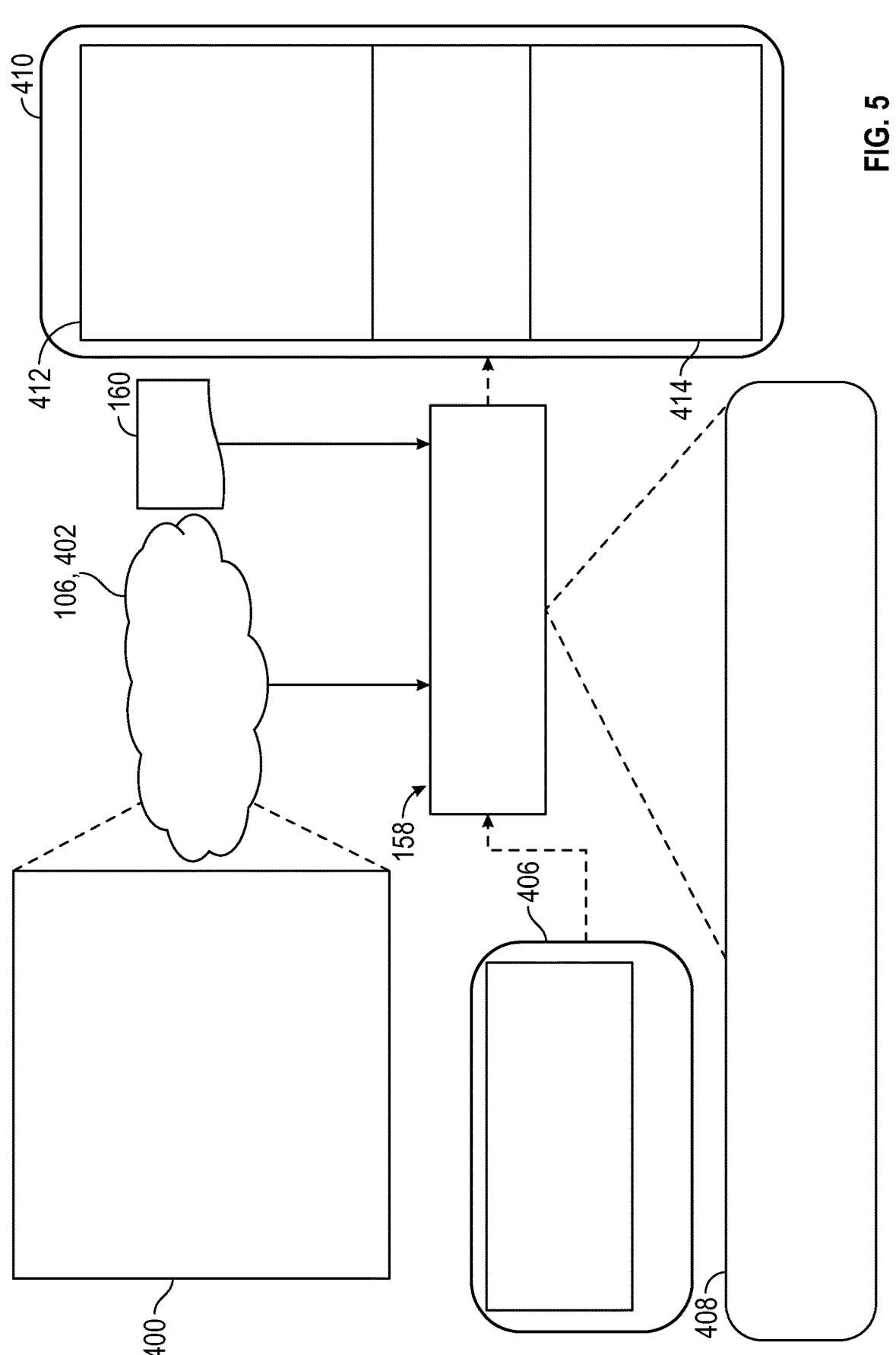
FIG. 5 is a flow diagram depicting logical flow of control logic for calculating and estimating a traffic signal change and time to stop for a traffic signal of the situation awareness energy harvesting system of FIG. 1 according to an exemplary embodiment.

Referring once more to FIG. 2, once the continuous observation 154 is complete, the SAGEH 30 application proceeds to block 158 where the SAGEH 30 calculates an estimate of a quantity of time for a traffic signal 18 change as well as estimating a time for the host vehicle 12 to stop for the signal 18. In several aspects, the estimation from block 158 utilizes both static rules 160 and dynamic rules to determine the time for traffic signal 18 change and time to stop for the traffic signal 18. Specifically, the calculation and estimation at block 158 is shown in additional detail in FIG. 5.

To calculate and estimate the quantity of time for the traffic signal 18 to change from one color to another, the SAGEH 30 application utilizes data from several different sources. Specifically, the SAGEH 30 application obtains or generates an information parameterized template, at block 400, including current and historical data from sensors 32 and from the cloud-computing server 13, including but not limited to: a current GPS location of the host vehicle 12, a traffic signal 18 identifier. In several aspects, the traffic signal identifier 18 is a unique identifier that defines which traffic signal 18 is currently relevant to the host vehicle 12, given the vehicle's 12 current planned path. The information template 400 also includes traffic signal 18 pattern information associated with the relevant traffic signal 18. The traffic signal 18 pattern information may include a quantity of time that the traffic signal 18 is programmed to be green (e.g. 180 seconds), red (e.g. 120 seconds), yellow (e.g. 5 seconds), a green arrow (e.g. 90 seconds), or the like. In further examples, the traffic signal 18 pattern information may include regular peak time information based on ToD data. In some examples, when at a regular traffic peak ToD, when a vehicle 12 is within thirty-five meters of the traffic signal 18, the information template 400 may indicate that typical travel time for the host vehicle 12 to the traffic signal 18 is approximately forty seconds, whereas when the host vehicle 12 is more than thirty-five meters from the traffic signal 18, the time for the host vehicle 12 to arrive at the traffic signal 18 may be approximately ninety seconds. The information template 400 may be at least partially sourced from crowd-sources 106, including current and historical time-based traffic wait time and traffic signal 18 durations obtained by other vehicles 12' at block 402. At block 160, the SAGEH 30 application obtains the static rule set 160.

The static rule set 160 may include any of a variety of different operational rules for the host vehicle 12. For example, many host vehicles 12' utilize static rules that define a baseline behavior set for regenerative braking-based energy harvesting, automatic stop/start operation of ICE vehicle 12 engines, and the like. The static rule set at block 160 may, for example, include rules that cause a vehicle's 12 ICE to shut down when the host vehicle 12 is stopped, with the brake pedal depressed, and with an accelerator pedal position at a zero-throttle position, and with the host vehicle 12 HVAC system in an "off" state. Rules may also include determining whether a temperature of the ICE is at an optimum threshold temperature, and when the ICE is operating at a temperature below the threshold temperature, then the ICE is not commanded to switch off, and when the threshold temperature has been met or exceeded, the threshold temperature, the ICE is selectively commanded to switch off. Similarly, a regenerative braking system in an at least partially hybridized, or fully electric vehicle 12 may be engaged upon determining that the host vehicle 12 operator is decelerating at a predefined rate, at or below a predefined velocity, or the like. At block 406, the SAGEH 30 application obtains focus area relevant parameters, such as a current status of the traffic signal 18, an estimated time to reach the traffic signal 18, a quantity of remote vehicles 12' in front of the host vehicle 12, the presence or absence of a pedestrian crossing, and the like. The calculation and estimation at block 158 utilize the focus area relevant parameters from block 406, the static rule set from block 160, the crowd sourced data from block 402, and the information template information from block 400 as inputs to an artificial intelligence (AI), machine-learning (ML), or rule-based engine at block 408.

The AI, ML, or rule-based engine may utilize a variety of different AI, ML, and/or rule-based applications 28, or control logic subroutines to define estimates of traffic signal 18 behavior along the host vehicle's 12 planned path. The AI, ML, and/or rule-based methodologies may include, but are not limited to, linear regressive models, deep neural networks, logistic regressions, decision trees, linear discriminant analysis, trained using the crowd sourced data and the like without departing from the scope or intent of the present disclosure. In an example of a rule-based engine, the SAGEH 30 application may utilize control logic according to the logical flow pattern that follows:

If (traffic signal 18==red) && (Path==Straight) && (# of vehicles 12' in front>=3) && (Time==Medium Traffic) && (Estimated Time to Reach traffic signal 18<=40% of traffic signal 18 duration)→Wait time at the traffic signal 18<30 seconds estimated at Red traffic signal 18.

However, it should be appreciated that the logical flow above is intended to only be a non-limiting example for the rule-based methodology, and that departures therefrom are intended to be within the scope and intended coverage of the instant disclosure.

The AI, ML, and/or rule-based engine at block 408 provides for the calculation and estimation at block 158 to generate an estimate of traffic signal 18 behavior at block 410. In several aspects, the traffic signal 18 behavior estimate at block 410, varies substantially from situation to situation, from application to application.

In a first example 412, given that the most proximate traffic signal 18 is currently "red" and that there are currently four (4) vehicles 12' in front of the host vehicle 12 at the current time of the day, and that it will take approximately fifteen seconds for the host vehicle 12 to reach the traffic signal 18, the traffic signal 18 may turn "green" within approximately twenty (20) seconds. Therefore, in light of the situation defined within the first example, the host vehicle 12 may selectively engage an ICE and/or EV control system to alter a behavior of the ICE and/or EV control system of the host vehicle 12.

In a second example 414, given that the most proximate traffic signal 18 is currently "green" and that there are currently zero (0) vehicles 12' in front of the host vehicle 12 at the current time of the day, and that it will take approximately twenty seconds for the host vehicle 12 to reach the traffic signal 18, the traffic signal 18 may turn "red" within approximately twenty (20) seconds. Therefore, in light of the situation defined within the first example, the host vehicle 12 may selectively engage an ICE and/or EV control system to alter a behavior of the ICE and/or EV control system of the host vehicle 12.

Referring once more to FIG. 2 and with continuing reference to FIGS. 1 and 3-5, once at block 158, the SAGEH 30 application has calculated and generated an estimated amount of time for the traffic signal 18 to change from one color to another and/or calculated an estimated stopped time at the traffic signal 18, the SAGEH 30 application proceeds to block 162 where the system 10 generates an ICE and/or EV control system output.

Figure 6:
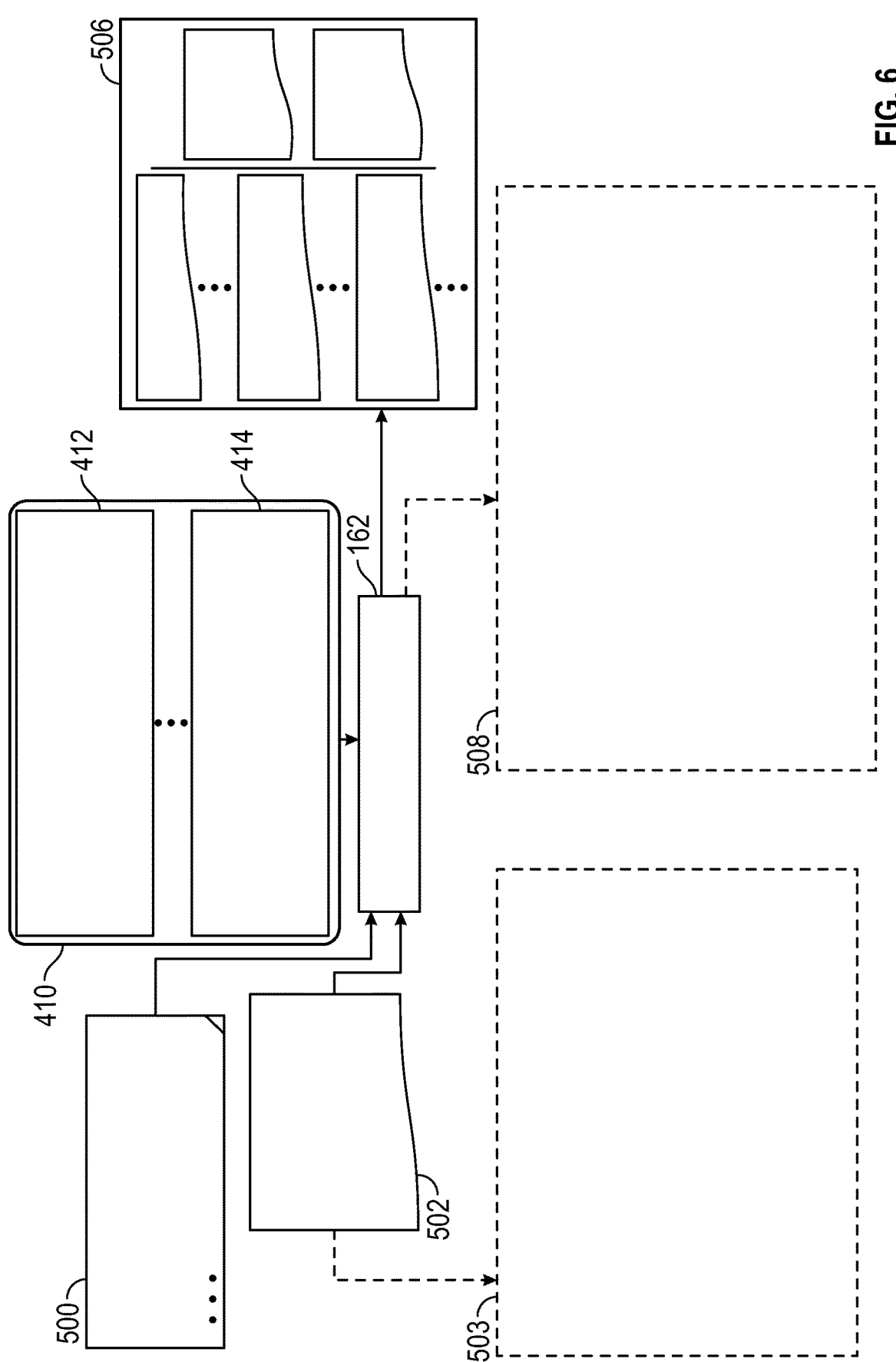
FIG. 6 is a flow diagram depicting logical flow of control logic for a control output calculation of the situation awareness energy harvesting system of FIG. 1 according to an exemplary embodiment.

The ICE and/or EV control system output calculations are shown in further detail in FIG. 6. In several aspects, the ICE and/or control system output calculations at block 162 utilize inputs from a variety of sources, including data obtained from the various sensors 32. More specifically, at block 500, host vehicle 12 parameters are obtained from the sensors 32. The host vehicle 12 parameters may include a variety of information relating to host vehicle 12 movement, position on the road segment 38, and GPS location. In some non-limiting examples, the host vehicle 12 parameters may include a host vehicle 12 speed in the X-direction, a host vehicle 12 speed in the Y-direction, a current state of charge (SoC) of a traction battery of an electric or electrified vehicle 12, and the like.

At block 502, the SAGEH 30 application obtains a current static rule set and calibration along with obstacle interrupt detection along the road segment 38. In some non-limiting examples 503, the static rule set and calibration may, for an ICE-equipped vehicle 12, include rules preventing ICE shut-down when a fuel level of the host vehicle 12 is less than or equal to a predetermined minimum capacity threshold, when an outside ambient temperature is below a threshold temperature or above a second threshold temperature, or the like. In some specific non-limiting examples, the predetermined minimum fuel capacity threshold may be a fuel level less than or equal to 1% of a vehicle 12 fuel capacity, the outside ambient temperature thresholds may be above 90° Fahrenheit, or below 15° Fahrenheit, or the like. Similarly, for an electric vehicle (EV), the static rule set and calibration may include rules that prevent regenerative braking activation when the EV is travelling in traffic that is moving at a speed below a threshold speed, such as below twenty miles-per-hour, when no stopping point or exit is available, when the host vehicle 12 operator indicates a desire that the EV be allowed to coast, or the like. In further examples, when the sensors 32 detect a change in circumstances or situation, the static rule set, calibration, and obstacle interrupt detection recalculates to adapt to the changed circumstances.

The estimate of traffic signal 18 behavior from block 410 is retrieved and taken as an input into the ICE and/or EV control output calculations at block 504 along with the host vehicle parameters from block 500, and the current static rule set from block 502. In several aspects, the ICE and/or EV control output calculations at block 504 include calculations to generate control signals at block 506, that manage the performance of ICE and/or EV systems in vehicles 12'.

In a non-limiting example, at block 506 for ICE systems, the control output calculations generate control outputs 508 that cause the engine in an ICE-equipped vehicle 12 to remain on, or to automatically shut off when one or more threshold conditions are met. More specifically, in an ICE-equipped vehicle 12, the control output calculation may determine when an amount of time that the host vehicle 12 is stopped is greater than or equal to a threshold amount of time, the ICE of the host vehicle 12 will be switched off. Subsequently, based on the predicted traffic signal 18 stop time, i.e. a quantity of time before a color change from red to green occurs, the control output calculation at block 504 will start the ICE approximately one second before the predicted traffic signal 18 stop time ends. By anticipating the traffic signal 18 color change in this manner, a quantity of time that the host vehicle 12 is at rest with the ICE switched off, and while the traffic signal 18 is green is substantially reduced. By so anticipating the change of the traffic signal 18 color, a quantity of time that a vehicle 12 operator waits before the ICE may be used to accelerate is substantially reduced, or even eliminated entirely, leading to smoother traffic flow, and increased customer satisfaction and confidence in the host vehicle 12.

In another non-limiting example relating to EV vehicles 12', the control output calculations generate control outputs 508 that cause the regenerative braking system of a fully- or partially-electrically motivated vehicle 12 to alter performance when one or more threshold conditions are met. More specifically, such a fully- or partially-electrically motivated vehicle 12 or EV, the control output calculation may determine which of several different regenerative braking modes should be engaged. For instance, a level one coasting mode may be engaged and gradually, dynamically, automatically, and adaptively increase the quantity of regeneration based on: a distance to go, the presence of obstacles, and/or a distance to and/or current color and estimated time until a color change for a given traffic signal 18. The coasting mode regenerative braking may likewise be dynamically, automatically, and adaptively increased in intensity until the EV comes to a full stop at the traffic signal 18 when the traffic signal is red. In a few specific, but non-limiting examples, above a threshold distance of approximately fifty meters from a traffic signal 18 that is red or that is predicted to be red, the host vehicle 12 engages regenerative braking energy harvesting at approximately 25% of capacity. When the host vehicle 12 subsequently reaches the fifty-meter threshold distance, the host vehicle 12 increases the regenerative braking to approximately 65%, and by the time the host vehicle 12 is only ten meters from the red traffic signal 18, the regenerative braking is increased to 90% intensity or 90% capacity or more, thereby bringing the host vehicle 12 to a stop at an appropriate position relative to the red traffic signal 18, crosswalks, and the like.

By anticipating the traffic signal 18 color change in this manner, a smoothness of regenerative braking processes is improved along with a reduction in vehicle 12 operator intervention into braking, coasting, and acceleration processes results, along with overall improvements in smoothing traffic flow, and increased customer satisfaction and confidence in the host vehicle 12. It should be appreciated that the examples of control output calculations may vary substantially from application to application, and from situation to situation without departing from the scope or intent of the present disclosure.

Referring once more to FIG. 2 and with continuing reference to FIGS. 1 and 3-6, once the control outputs 508 have been sent to vehicle 12 control systems, including one or more of an ICE and a regenerative braking system, the SAGEH 30 application proceeds to block 164 where a vehicle 12 operator may provide feedback regarding the control outputs 508. More specifically, the host vehicle 12 operator may provide feedback regarding the control outputs 508 relative to vehicle 12 operator-desired vehicle 12 responses. The SAGEH 30 application utilizes the host vehicle 12 operator feedback to adjust future control output calculations through a federated learning mechanism.

Figure 7:
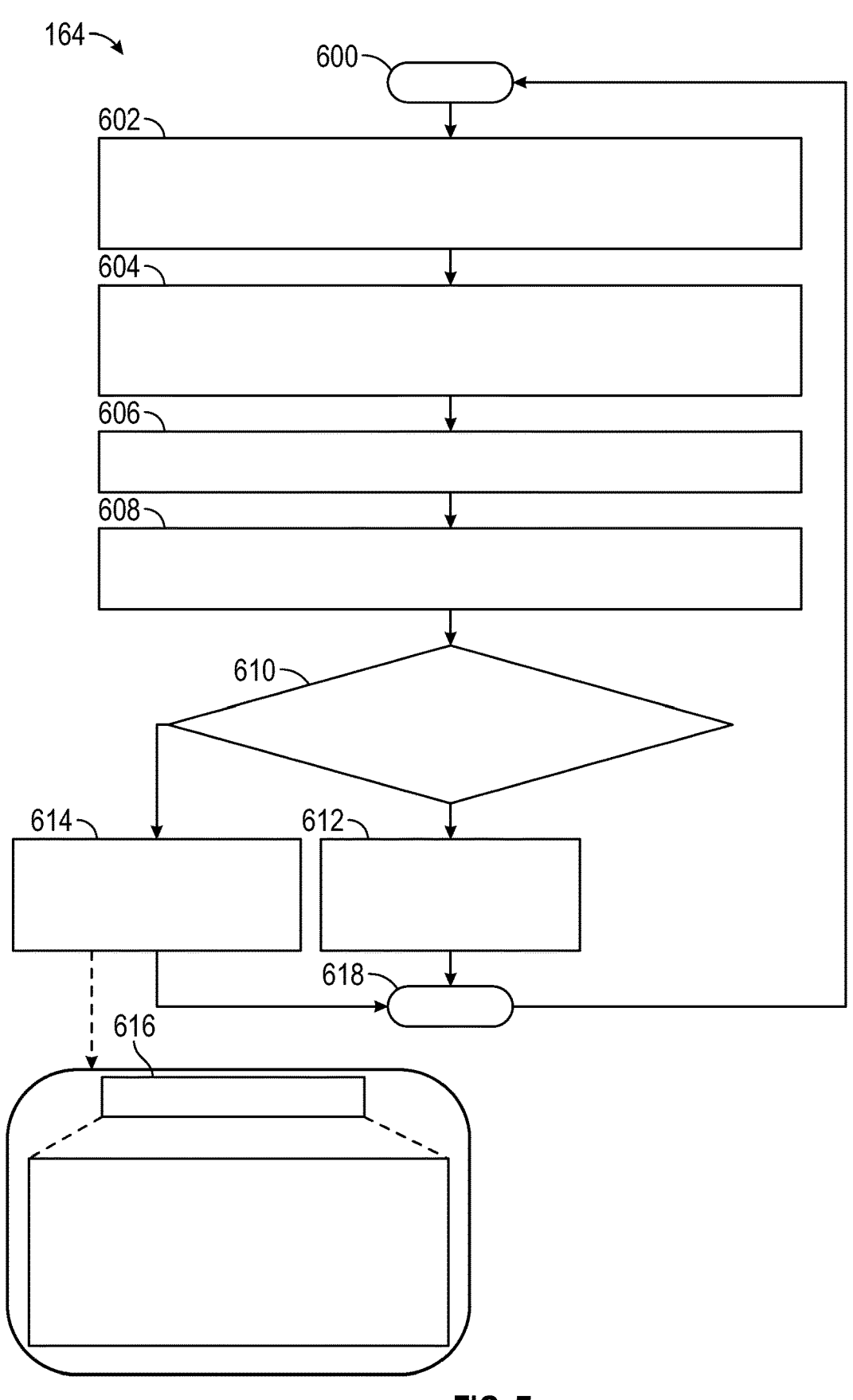
FIG. 7 is a flow diagram depicting logical flow of control logic for a vehicle operator feedback portion of the situation awareness energy harvesting system of FIG. 1 according to an exemplary embodiment.

Turning now to FIG. 7, and with continuing reference to FIGS. 1-6, the host vehicle 12 operator feedback at block 164 is shown in additional detail in flowchart form. At block 600, the operator feedback portion 164 of the SAGEH 30 application begins. At block 602, once the SAGEH 30 application has determined an energy harvesting strategy at block 508, time sequenced actions by the host vehicle 12 operator are collected during a specified time window. For example, sensor 32 data regarding brake application, acceleration, lane changes, and the like are collected. At block 604, a trigger check is performed. The trigger check compares expected vehicle 12 and traffic signal 18 behavior relative to actual recorded vehicle 12 and traffic signal 18 behavior. If a difference between expected and actual behaviors is greater than a threshold difference value, the operator feedback portion 164 triggers and prepares to generate a vehicle 12 operator feedback request. In several aspects, the trigger check at block 604 utilizes a trigger rule set that may cause the system 10 to trigger periodically, continuously, after the occurrence of a predetermined quantity of events, or the like. In some non-limiting examples, the trigger rule set may cause the trigger check at block 604 to occur once a month, upon reaching ten or more events, or the like.

At block 606, the operator feedback portion 164 creates a trigger for a vehicle 12 operator feedback request. The trigger at block 606 utilizes the trigger rule set from block 604 to specify the metes and bounds of the threshold values for expected versus actual vehicle 12 and traffic signal 18 behavior. At block 608, the operator feedback portion 164 prepares a time sequence of expected actions and actual actions performed, as well as feedback information. In several aspects, the data prepared at block 606 includes energy auto harvesting system control output decision information, and the like.

At block 610, the operator feedback portion 164 determines when actual and expected actions correlate within a predetermined quantity of time. Upon determining that the actual and expected actions do correlate during the predetermined quantity of time, the operator feedback portion 164 proceeds to block 612 where the present GPS location of the host vehicle 12 is tagged or otherwise flagged as being "good", or otherwise accurate. However, when the actual and expected actions do not correlate at block 610, the operator feedback portion 164 of the SAGEH 30 application proceeds to block 614, and the present GPS location of the host vehicle 12 is tagged with the difference between actual and expected actions, and the resulting information is transmitted via the I/O ports to the cloud-computing server 13, where a database is appropriately updated with the difference between actual and expected information. Additionally, when the actual and expected actions do not correlate, the operator feedback portion 164 proceeds to block 616 where a consistency check is performed. The consistency check at block 616 causes the system 10 to monitor a quantity of change requests and determine if the differences requested are greater than or equal to a threshold change value. When the change requests exceed the threshold, the consistency check 616 causes additional data to be collected. However, when the differences requested are less than the threshold change value, the operator feedback portion 164 triggers an update and causes the differences to be implemented in memory 24 of the cloud computing server 24. From either block 612 or block 614, the operator feedback portion 164 proceeds to block 618, where the operator feedback portion ends. The operator feedback portion 618 may operate continuously, periodically, or upon the occurrence of one or more events during vehicle 12 operation by returning once more to block 600 and running again.

Referring once again to FIG. 2, and with continuing reference to FIGS. 1 and 3-7, once the consistency check 616 has been performed, the SAGEH 30 application returns once more to the data collection portion 100 and the crowd-sourced data 106 is updated with the results of the consistency check 616 upon the next iteration while the SAGEH 30 application is running.

A system and method for situation awareness guided energy harvesting of the present disclosure offers several advantages. These include situationally-aware energy harvesting, while utilizing existing hardware, and while maintaining or decreasing system 10 component complexity and computational complexity, all while improving host vehicle 12 operator comfort and satisfaction, and while reducing energy consumption in vehicles 12, 12' equipped with the system 10.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for situation awareness guided energy harvesting in vehicles comprises:

a host vehicle, and one or more remote vehicles;

one or more sensors capturing host vehicle and remote vehicle information, and capturing environmental information about an environment of the host vehicle and the one or more remote vehicles; and a cloud computing server in communication with the host vehicle and the one or more remote vehicles;

wherein each of the host vehicle, the one or more remote vehicles, and the cloud computing server has a controller, the controller including a processor, a memory, and one or more input/output (I/O) ports, the I/O ports in communication with the one or more sensors; the memory storing programmatic control logic; the processor executing the programmatic control logic; the programmatic control logic including an application for situation awareness guided energy harvesting (SAGEH), the SAGEH application comprising:

a first control logic for triggering collection of host vehicle information, remote vehicle information, and environmental information from the one or more sensors;

a second control logic for continuously observing a traffic signal and traffic situation along a host vehicle navigation path along a road segment;

a third control logic for generating a first estimated quantity of time for the traffic signal to change status and for generating a second estimated quantity of time for the host vehicle to stop at the traffic signal;

a fourth control logic for, in response to one or more of the first and second estimated quantities of time, generating a control output command; and a fifth control logic that collects time sequenced actions by a vehicle operator during a time window;

presents a vehicle operator with a feedback request and causes the vehicle operator to generate feedback about the control output command, wherein the control output command causes the vehicle to dynamically, automatically, and adaptively engage one or more of an internal combustion engine (ICE) stop/start system, and a regenerative braking system to dynamically, automatically, and adaptively harvest energy;

compares expected and actual behavior to a threshold value, wherein upon determining that the actual behavior is greater than the threshold value, tags a current host vehicle location a difference between the actual and expected behaviors; and triggers a change request in crowd-sourced data hosted in the memory of the cloud computing server, wherein when a quantity of change requests meets or exceeds a change request threshold, the control logic triggers a change in expected behavior, and when a quantity of change requests is below the change request threshold, the control logic triggers additional data collection;

wherein the feedback comprises: vehicle operator feedback about control outputs relative to vehicle operator-desired vehicle responses, and upon determining that actual and expected vehicle responses are correlated during a predetermined quantity of time, control output commands are flagged as "good", and upon determining that actual and expected vehicle responses are not correlated during the predetermined quantity of time, control output commands are tagged with a difference between actual and expected actions, resulting information is transmitted to the cloud computing server where a databases is updated with the difference between actual and expected actions, and a consistency check is performed, wherein the consistency check causes the system to monitor a quantity of change requests and determine if differences between the differences requested are greater than or equal to a threshold change value, and upon determining that the quantity of change requests exceeds the threshold, the consistency check causes additional data to be collected, and upon determining that the quantity of change requests does not exceed the threshold, the feedback from the vehicle operator triggers an update that cause the differences to be implemented in memory of the cloud computing server.

2. The system of claim 1, wherein the first control logic further comprises:

detecting host and remote vehicle position information, host vehicle navigation information, and environmental information within data from the one or more sensors, wherein the one or more sensors further comprise one or more of:

cameras, Light Detection and Ranging (LiDAR) sensors, Radio Detection and Ranging (RADAR) sensors, Sound Navigation and Ranging (SONAR) sensors, ultrasonic sensors, motion sensors, inertial measurement units (IMUs), global positioning system (GPS) sensors, cellular tower sensors, and traffic signal sensors;

determining from the host and remote vehicle position information, host vehicle navigation information, and environmental information that a situation of the host vehicle has changed;

enabling data collection specific to the road segment including, collecting from the one or more sensors: camera data; time of day (ToD) information, seasonal information, traffic information, and global position system (GPS) location and navigation information;

deriving parametric information within the data specific to the road segment; and updating the data specific to the road segment with the parametric information and sending updated information about the road segment to the cloud computing server.

3. The system of claim 2, wherein the first control logic further comprises:

accessing crowd sourced data stored in memory of the cloud computing server and obtained from sensors of the one or more remote vehicles, sensors disposed on infrastructure comprising: traffic signals, GPS satellites, and cellular towers; and normalizing the data specific to the road segment to determine at least time-based traffic wait times and traffic signal duration information along the road segment.

4. The system of claim 1, wherein the second control logic further comprises:

engaging an energy harvesting feature of the host vehicle; and executing a stop and go estimation control logic, wherein the stop and go estimation control logic operates while the energy harvesting feature is engaged, and wherein the stop and go estimation control logic performs continuous situational information collection comprising: monitoring the navigation route of the host vehicle, monitoring GPS data, monitoring camera data, monitoring traffic information, and monitoring traffic signal periodicity.

5. The system of claim 4, wherein the second control logic further comprises:

processing data collected by the stop and go estimation control logic to calculate and derive parametric information about the road segment, the parametric information comprising: highway information, city road information, single or multiple lane information, straight road information, left turn information, right turn information, roundabout information, lane information, yield sign information, stop sign information, lane specific traffic signal and status information, other traffic signal and status information, pedestrian crossing information, and determining a quantity of pedestrians; and performing focus area status quo analysis control logic to define a current situation of the host vehicle along the road segment.

6. The system of claim 4, wherein the third control logic further comprises:

calculating the first and the second estimated quantities of time based on: a current traffic signal status, a quantity of remote vehicles in front the host vehicle, a time of day, a static rule set, and crowd sourced data comprising: a GPS location of the host vehicle, a traffic signal identifier, current and historical time-based traffic wait times, and current and historical traffic signal durations.

7. The system of claim 1, wherein the fourth control logic further comprises:

utilizing a static rule set, vehicle parameters including current host vehicle speed and current host vehicle state of charge, and estimated traffic signal behavior to dynamically, automatically, and adaptively generate a control output command to one or more of a regenerative braking system and an automatic stop/start system of the host vehicle.

8. The system of claim 7, wherein generating the control output command to the regenerative braking system of the host vehicle further comprises:

dynamically, automatically, and adaptively adjusting a regenerative braking intensity based on: a speed of the host vehicle, a distance between the host vehicle and the traffic signal, a state of traffic on the road segment, and estimated traffic signal behavior.

9. The system of claim 7, wherein generating the control output command to the automatic stop/start system of the host vehicle further comprises:

dynamically, automatically, and adaptively adjusting an ICE stop/start system to selectively stop an ICE of the host vehicle based on: a speed of the host vehicle, a distance between the host vehicle and the traffic signal, a state of traffic on the road segment, and estimated traffic signal behavior.

10. A method for situation awareness guided energy harvesting in a vehicle comprises:

capturing, via one or more sensors, information about a host vehicle and one or more remote vehicles, and capturing environmental information about an environment of the host vehicle and the one or more remote vehicles; and utilizing a cloud computing server in communication with the host vehicle and the one or more remote vehicles;

utilizing one or more controllers disposed in each of the host vehicle, the one or more remote vehicles, and the cloud computing server, each of the controllers including a processor, a memory, and one or more input/output (I/O) ports, the I/O ports in communication with the one or more sensors; the memory storing programmatic control logic; the processor executing the programmatic control logic; the programmatic control logic including an application for situation awareness guided energy harvesting (SAGEH), the SAGEH application comprising:

triggering collection of host vehicle information, remote vehicle information, and environmental information from the one or more sensors;

continuously observing a traffic signal and traffic situation along a host vehicle navigation path along a road segment;

generating a first estimated quantity of time for the traffic signal to change status and for generating a second estimated quantity of time for the host vehicle to stop at the traffic signal;

in response to one or more of the first and second estimated quantities of time, generating a control output command;

presenting a vehicle operator with a feedback request and causing the vehicle operator to generate feedback about the control output command, wherein the control output command causes the vehicle to dynamically, automatically, and adaptively engage one or more of an internal combustion engine (ICE) stop/start system, and a regenerative braking system to dynamically, automatically, and adaptively harvest energy:

collecting time sequenced actions by a vehicle operator during a time window;

comparing expected and actual behavior to a threshold value, wherein upon determining that the actual behavior is greater than the threshold value, tags a current host vehicle location a difference between the actual and expected behaviors; and triggering a change request in crowd-sourced data hosted in the memory of the cloud computing server, wherein when a quantity of change requests meets or exceeds a change request threshold, the control logic triggers a change in expected behavior, and when a quantity of change requests is below the change request threshold, the control logic triggers additional data collection wherein the feedback comprises: vehicle operator feedback about control outputs relative to vehicle operator-desired vehicle responses, and upon determining that actual and expected vehicle responses are correlated during a predetermined quantity of time, flagging control output commands as "good", and upon determining that actual and expected vehicle responses are not correlated during the predetermined quantity of time, tagging control output commands with a difference between actual and expected actions; and transmitting resulting information to the cloud computing server where a databases is updated with the difference between actual and expected actions, and a consistency check is performed, wherein the consistency check causes monitoring of a quantity of change requests and determining if differences between the differences requested are greater than or equal to a threshold change value; and upon determining that the quantity of change requests exceeds the threshold, causing additional data to be collected, and upon determining that the quantity of change requests does not exceed the threshold, triggering an update that cause the differences to be implemented in memory of the cloud computing server based on the feedback from the vehicle operator.

11. The method of claim 10, further comprising:

detecting host and remote vehicle position information, host vehicle navigation information, and environmental information within data from the one or more sensors, wherein the one or more sensors further comprise one or more of:

cameras, Light Detection and Ranging (LiDAR) sensors, Radio Detection and Ranging (RADAR) sensors, Sound Navigation and Ranging (SONAR) sensors, ultrasonic sensors, motion sensors, inertial measurement units (IMUs), global positioning system (GPS) sensors, cellular tower sensors, and traffic signal sensors;

determining from the host and remote vehicle position information, host vehicle navigation information, and environmental information that a situation of the host vehicle has changed;

enabling data collection specific to the road segment including, collecting from the one or more sensors: camera data; time of day (ToD) information, seasonal information, traffic information, and global position system (GPS) location and navigation information;

deriving parametric information within the data specific to the road segment; and updating the data specific to the road segment with the parametric information and sending updated information about the road segment to the cloud computing server.

12. The method of claim 11, further comprising:

accessing crowd sourced data stored in memory of the cloud computing server and obtained from sensors of the one or more remote vehicles, sensors disposed on infrastructure comprising: traffic signals, GPS satellites, and cellular towers; and normalizing the data specific to the road segment to determine at least time-based traffic wait times and traffic signal duration information along the road segment.

13. The method of claim 10, further comprising:

engaging an energy harvesting feature of the host vehicle; and executing a stop and go estimation control logic, wherein the stop and go estimation control logic operates while the energy harvesting feature is engaged, and wherein the stop and go estimation control logic performs continuous situational information collection comprising: monitoring the navigation route of the host vehicle, monitoring GPS data, monitoring camera data, monitoring traffic information, and monitoring traffic signal periodicity.

14. The method of claim 13, further comprising:

processing data collected by the stop and go estimation control logic to calculate and derive parametric information about the road segment, the parametric information comprising: highway information, city road information, single or multiple lane information, straight road information, left turn information, right turn information, roundabout information, lane information, yield sign information, stop sign information, lane specific traffic signal and status information, other traffic signal and status information, pedestrian crossing information, and determining a quantity of pedestrians; and performing focus area status quo analysis control logic to define a current situation of the host vehicle along the road segment.

15. The method of claim 13, further comprising:

calculating the first and the second estimated quantities of time based on: a current traffic signal status, a quantity of remote vehicles in front the host vehicle, a time of day, a static rule set, and crowd sourced data comprising: a GPS location of the host vehicle, a traffic signal identifier, current and historical time-based traffic wait times, and current and historical traffic signal durations.

16. The method of claim 10, further comprising:

utilizing a static rule set, vehicle parameters including current host vehicle speed and current host vehicle state of charge, and estimated traffic signal behavior to dynamically, automatically, and adaptively generate a control output command to one or more of a regenerative braking system and an automatic stop/start system of the host vehicle.

17. The method of claim 16, wherein generating the control output command to the regenerative braking system of the host vehicle further comprises:

dynamically, automatically, and adaptively adjusting a regenerative braking intensity based on: a speed of the host vehicle, a distance between the host vehicle and the traffic signal, a state of traffic on the road segment, and estimated traffic signal behavior; and dynamically, automatically, and adaptively adjusting an ICE stop/start system to selectively stop an ICE of the host vehicle based on: a speed of the host vehicle, a distance between the host vehicle and the traffic signal, a state of traffic on the road segment, and estimated traffic signal behavior.

18. A method for situation awareness guided energy harvesting in a vehicle comprises:

capturing, via one or more sensors, information about a host vehicle and one or more remote vehicles, and capturing environmental information about an environment of the host vehicle and the one or more remote vehicles; and utilizing a cloud computing server in communication with the host vehicle and the one or more remote vehicles;

utilizing one or more controllers disposed in each of the host vehicle, the one or more remote vehicles, and the cloud computing server, each of the controllers including a processor, a memory, and one or more input/output (I/O) ports, the I/O ports in communication with the one or more sensors; the memory storing programmatic control logic; the processor executing the programmatic control logic; the programmatic control logic including an application for situation awareness guided energy harvesting (SAGEH), the SAGEH application comprising:

triggering collection of host vehicle information, remote vehicle information, and environmental information from the one or more sensors, including:

detecting host and remote vehicle position information, host vehicle navigation information, and environmental information within data from the one or more sensors;

determining from the host and remote vehicle position information, host vehicle navigation information, and environmental information that a situation of the host vehicle has changed;

enabling data collection specific to a road segment including, collecting from the one or more sensors: camera data; time of day (ToD) information, seasonal information, traffic information, and global position system (GPS) location and navigation information;

deriving parametric information within the data specific to the road segment;

updating the data specific to the road segment with the parametric information and sending updated information about the road segment to the cloud computing server;

accessing crowd sourced data stored in memory of the cloud computing server and obtained from sensors of the one or more remote vehicles, sensors disposed on infrastructure comprising: traffic signals, GPS satellites, and cellular towers, wherein the sensors further comprise one or more of:

cameras, Light Detection and Ranging (LiDAR) sensors, Radio Detection and Ranging (RADAR) sensors, Sound Navigation and Ranging (SONAR) sensors, ultrasonic sensors, motion sensors, inertial measurement units (IMUs), global positioning system (GPS) sensors, cellular tower sensors, and traffic signal sensors; and normalizing the data specific to the road segment to determine at least time-based traffic wait times and traffic signal duration information along the road segment;

continuously observing a traffic signal and traffic situation along a host vehicle navigation path along the road segment, including:

engaging an energy harvesting feature of the host vehicle;

executing a stop and go estimation control logic, wherein the stop and go estimation control logic operates while the energy harvesting feature is engaged, and wherein the stop and go estimation control logic performs continuous situational information collection comprising: monitoring the navigation route of the host vehicle, monitoring GPS data, monitoring camera data, monitoring traffic information, and monitoring traffic signal periodicity;

processing data collected by the stop and go estimation control logic to calculate and derive parametric information about the road segment, the parametric information comprising: highway information, city road information, single or multiple lane information, straight road information, left turn information, right turn information, roundabout information, lane information, yield sign information, stop sign information, lane specific traffic signal and status information, other traffic signal and status information, pedestrian crossing information, and determining a quantity of pedestrians; and performing focus area status quo analysis control logic
to define a current situation of the host vehicle along
the road segment;

generating a first estimated quantity of time for the traffic
signal to change status and for generating a second
estimated quantity of time for the host vehicle to stop
at the traffic signal, including:

calculating the first and the second estimated quantities
of time based on: a current traffic signal status, a
quantity of remote vehicles in front the host vehicle,
a time of day, a static rule set, and crowd sourced
data comprising: a GPS location of the host vehicle,
a traffic signal identifier, current and historical time-
based traffic wait times, and current and historical
traffic signal durations;

in response to one or more of the first and second
estimated quantities of time, generating a control out-
put command, including:

utilizing a static rule set, vehicle parameters including
current host vehicle speed and current host vehicle
state of charge, and estimated traffic signal behavior
to dynamically, automatically, and adaptively gener-
ate a control output command to one or more of a
regenerative braking system and an automatic stop/
start system of the host vehicle, wherein generating
the control output command to the regenerative
braking system of the host vehicle further comprises:

dynamically, automatically, and adaptively adjusting
a regenerative braking intensity based on: a speed
of the host vehicle, a distance between the host
vehicle and the traffic signal, a state of traffic on
the road segment, and estimated traffic signal
behavior; and dynamically, automatically, and adaptively adjusting
an ICE stop/start system to selectively stop an ICE
of the host vehicle based: on a speed of the host
vehicle, a distance between the host vehicle and
the traffic signal, a state of traffic on the road
segment, and estimated traffic signal behavior; and presenting a vehicle operator with a feedback request and
causing the vehicle operator to generate feedback about
the control output command, including:

control logic that collects time sequenced actions by a
vehicle operator during a time window;

control logic that compares expected and actual behav-
ior to a threshold value, wherein upon determining
that the actual behavior is greater than the threshold
value, tags a current host vehicle location a differ-
ence between the actual and expected behaviors;

control logic that triggers a change request in crowd-
sourced data hosted in the memory of the cloud
computing server, wherein when a quantity of
change requests meets or exceeds a change request
threshold, the control logic triggers a change in
expected behavior, and when a quantity of change
requests is below the change request threshold, the
control logic triggers additional data collection; and wherein the control output command causes the vehicle to
dynamically, automatically, and adaptively engage one
or more of an internal combustion engine (ICE) stop/
start system, and a regenerative braking system to
dynamically, automatically, and adaptively harvest
energy, wherein the feedback comprises: vehicle opera-
tor feedback about control outputs relative to vehicle
operator-desired vehicle responses, and upon determin-
ing that actual and expected vehicle responses are
correlated during a predetermined quantity of time,
flagging control output commands as "good", and upon
determining that actual and expected vehicle responses
are not correlated during the predetermined quantity of
time, tagging control output commands with a differ-
ence between actual and expected actions:

transmitting resulting information to the cloud computing
server where a databases is updated with the difference
between actual and expected actions, and a consistency
check is performed, wherein the consistency check
causes monitoring of a quantity of change requests and
determining if differences between the differences
requested are greater than or equal to a threshold
change value; and upon determining that the quantity of
change requests exceeds the threshold, causing addi-
tional data to be collected, and upon determining that
the quantity of change requests does not exceed the
threshold, triggering an update that cause the differ-
ences to be implemented in memory of the cloud
computing server based on the feedback from the
vehicle operator.

* * * * *